(12) United States Patent  
Port-Robach et al.

(10) Patent No.: US 7,866,602 B2
(45) Date of Patent: Jan. 11, 2011

(54) SENSING LOAD RELIEF BY A SECONDARY PATH OF A FLIGHT CONTROL ACTUATOR

(75) Inventors: Isabelle Port-Robach, Deuil la Barre (FR); Jean-Pierre Raynal, Baillet en France (FR); Jean-Marc Moalic, Saint Gratien (FR)

(73) Assignee: Goodrich Actuation Systems SAS (FR)

( * ) Notice: Subject to any disclaimer, the term of this patent is extended or adjusted under 35 U.S.C. 154(b) by 449 days.

(21) Appl. No.: 12/028,150

(22) Filed: Feb. 8, 2008

(65) Prior Publication Data

US 2008/0265091 A1    Oct. 30, 2008

(30) Foreign Application Priority Data

Feb. 8, 2007   (FR)  .................................. 07 53131

(51) Int. Cl.
*B64C 13/00* (2006.01)
(52) U.S. Cl. .................. 244/99.4; 244/99.3; 244/99.2
(58) Field of Classification Search ............. 244/99.4, 244/99.3, 99.2
See application file for complete search history.

(56) References Cited

U.S. PATENT DOCUMENTS

| 2,620,683 | A  | * | 12/1952 | Geyer ......................... 74/665 Q |
|---|---|---|---|---|
| 5,628,477 | A  | * | 5/1997 | Caferro et al. ............... 244/214 |
| 6,389,915 | B1 | * | 5/2002 | Wngett ........................ 74/89.23 |
| 6,659,399 | B1 | * | 12/2003 | Bagnoli et al. .............. 244/99.4 |
| 6,672,540 | B1 | * | 1/2004 | Shaheen et al. ............. 244/99.3 |
| 6,704,624 | B2 | * | 3/2004 | Ortega et al. .................... 701/3 |
| 6,851,648 | B2 | * | 2/2005 | Perni et al. .................. 244/99.3 |
| 2007/0018040 | A1 | * | 1/2007 | Wingett et al. .............. 244/99.4 |
| 2008/0116317 | A1 | * | 5/2008 | Steinberg .................... 244/99.3 |
| 2010/0001125 | A1 | * | 1/2010 | Cavalier et al. ............. 244/99.3 |

* cited by examiner

*Primary Examiner*—Christopher P Ellis
(74) *Attorney, Agent, or Firm*—Faegre & Benson LLP

(57) ABSTRACT

Device for sensing load relief by a secondary path of a flight control actuator having a primary path and a secondary path capable of relieving the load of the primary path in the event of a breakdown thereof, the primary path comprising a screw, the screw terminating in a fastener of the primary path, the secondary path comprising an emergency load relief rod passing through the screw, this rod terminating in a male shape which, when the primary path is carrying the load, is accommodated inside of a female shape of a fastener of the secondary path, characterized in that at least one sensing element is disposed on the male shape terminating the rod, on the female shape or between both of these two shapes, this sensing element being designed to wear down due to the friction between the male shape and the female shape, when the secondary path is loaded and is relieving the load, this sensing element being connected or capable of being connected to means capable of sensing wear on this sensing element and of triggering an alarm when such wear is sensed.

11 Claims, 3 Drawing Sheets

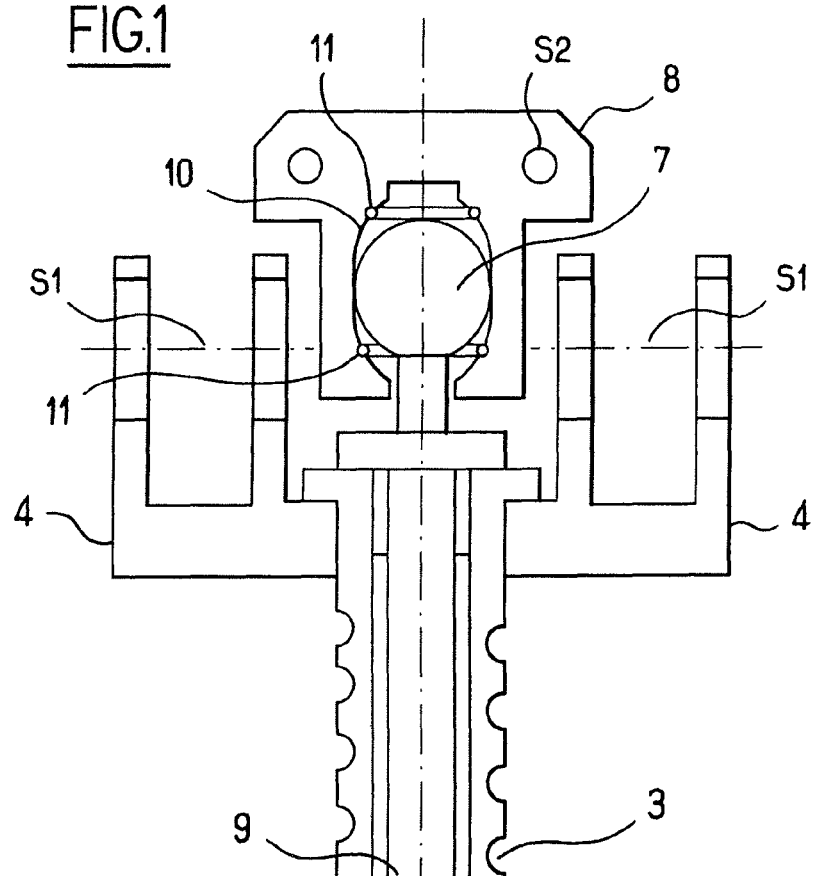
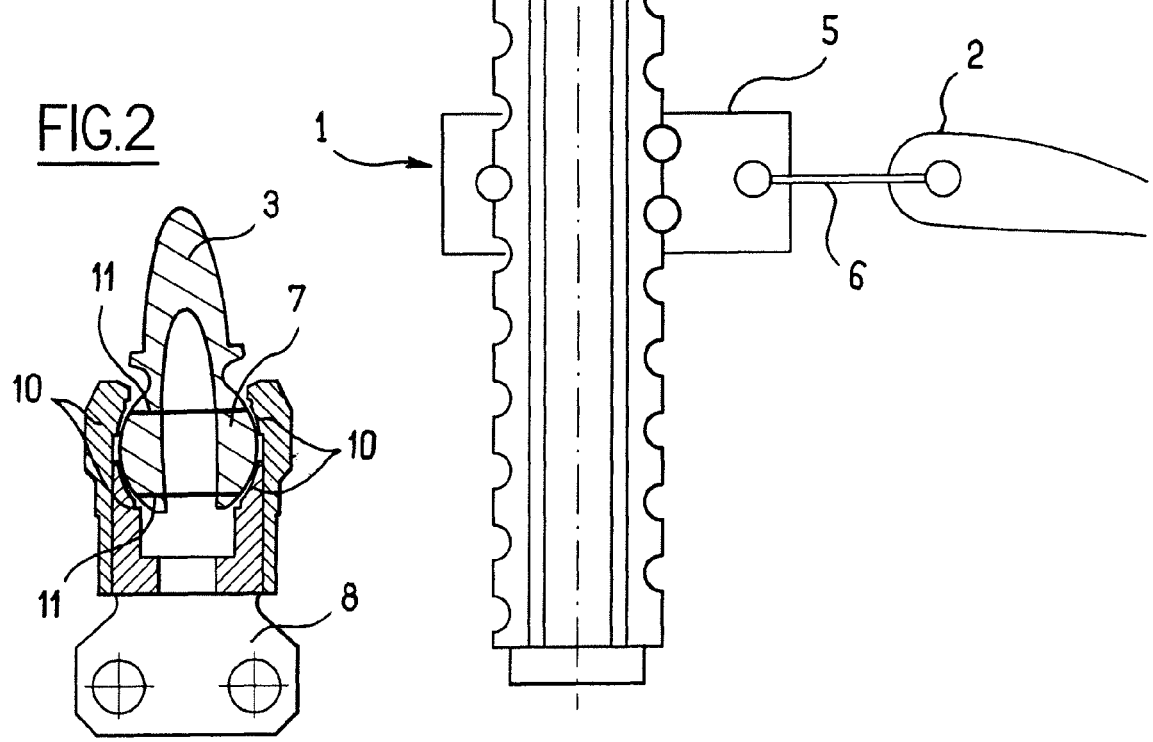

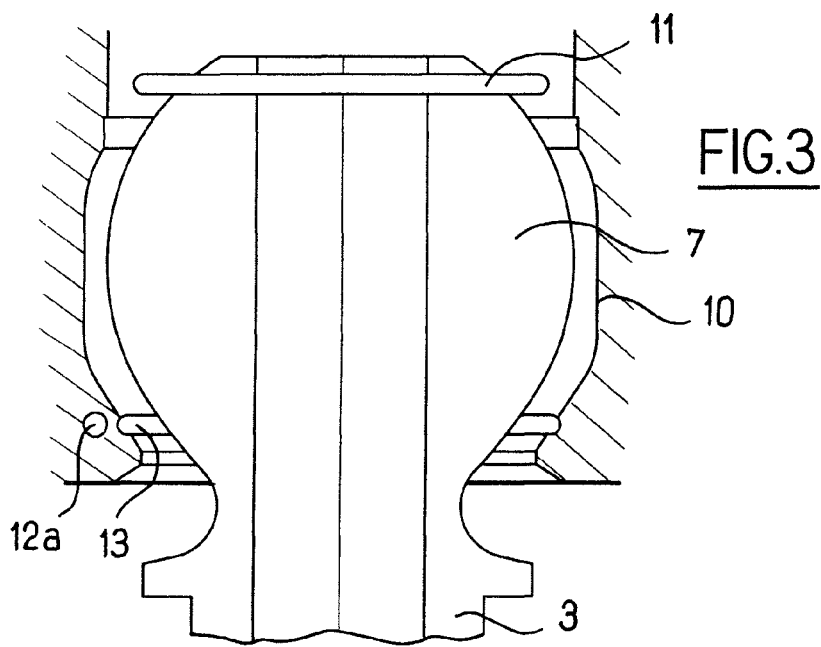
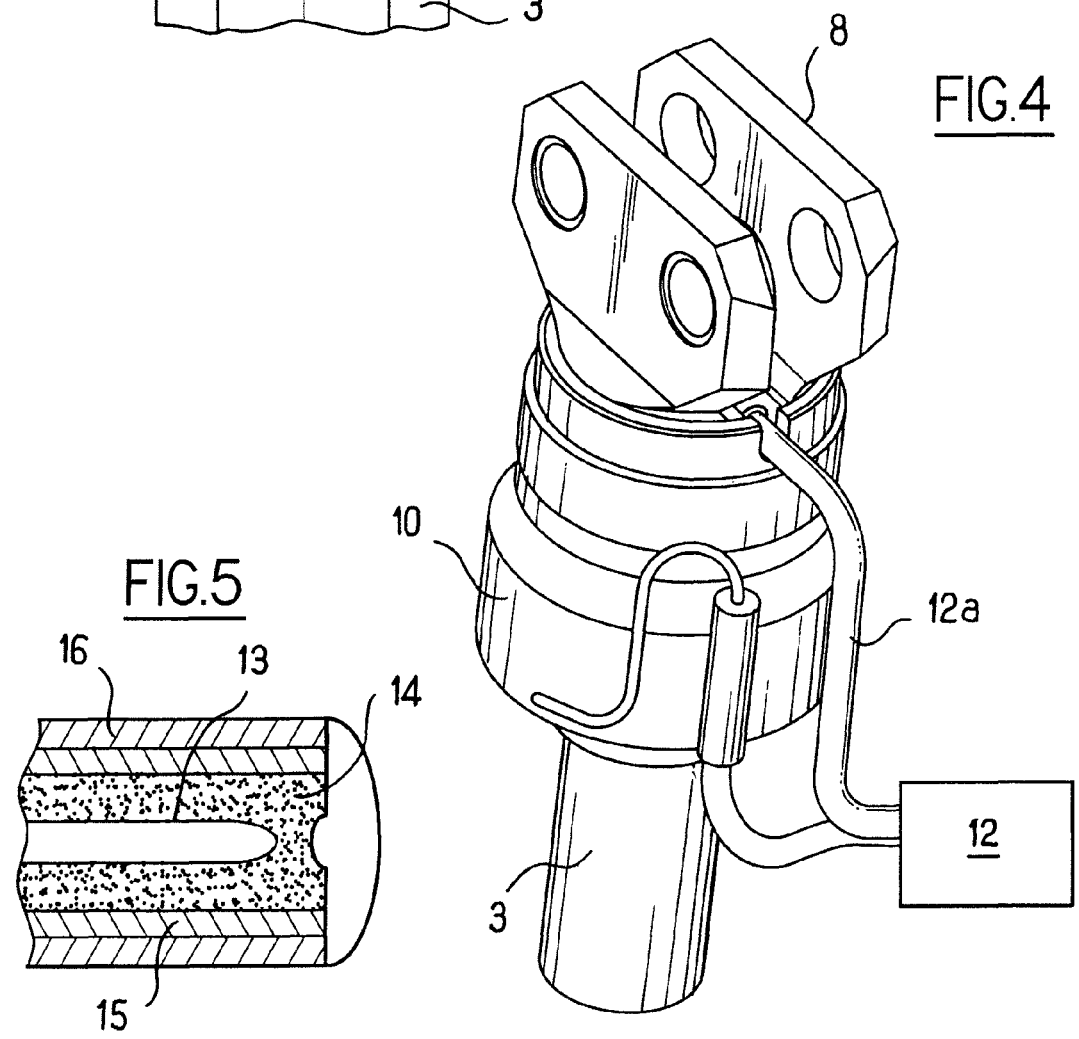

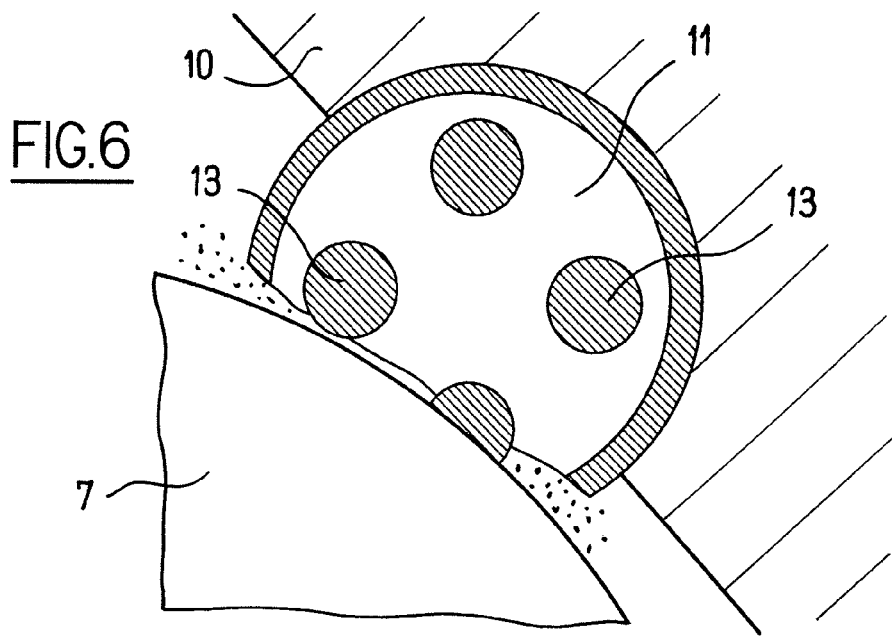
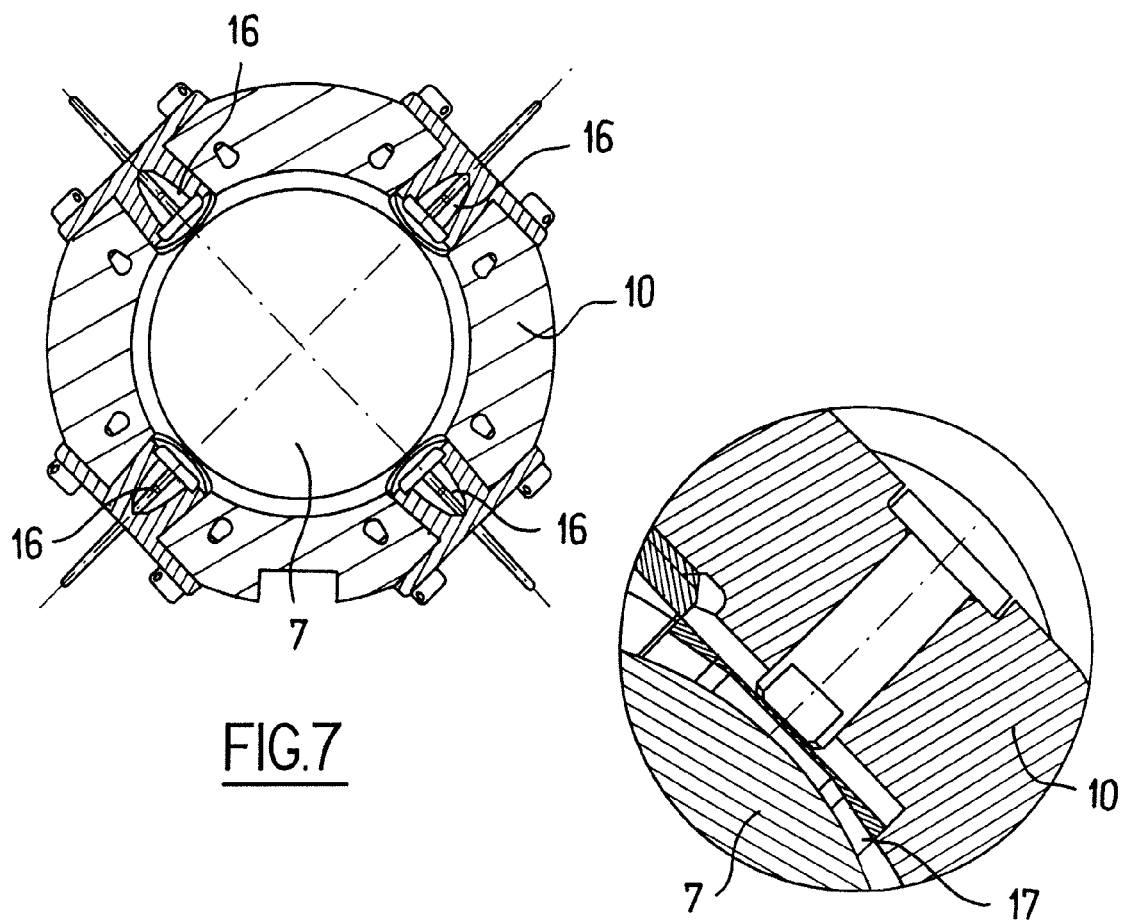

SENSING LOAD RELIEF BY A SECONDARY PATH OF A FLIGHT CONTROL ACTUATOR

GENERAL TECHNICAL FIELD AND PRIOR ART

This invention relates to load relief by a secondary path of an aircraft flight control actuator.

It advantageously finds application, in particular, in the case of a THSA-type actuator ("Trimmable Horizontal Stabilizer Actuator"). It is known that such actuators conventionally comprise two mechanical paths, one primary, the other secondary, the latter being intended for relieving the load when the primary path breaks down.

During primary path operation, loads transit through a hollow ball or roller screw. This feature enables an emergency rod (so-called "fail-safe" bar) to be housed therein, which is grooved at its ends and connected to the screw with an allowance. This structure ensures continuity in the load and rotation transmission of the assembly (by preventing axial separation of the screw elements, in the event that the screw itself breaks off). The screw terminates at one of the ends thereof in a fastener, whereby it is connected to the aircraft (primary top fastener). In the event of a breakdown of said fastener, the load pathway transits through the emergency rod the end of which is a male shape (e.g., a sphere), which is disposed inside a female shape of a secondary path fastener (secondary top fastener).

During "normal" operation, when the primary path is carrying the load, there is an allowance between the male shape, which terminates the emergency rod, and the female shape of the secondary path fastener, whereby no contact should occur between said male shape and said fastener; during load relief by the secondary path, the male shape, which terminates the screw, comes into contact with the female shape of the secondary path fastener.

DISCLOSURE OF THE INVENTION

One object of the invention is to propose a solution for sensing load relief, in particular for the purpose of informing the pilot that the secondary path has relieved the primary path.

In particular, another object of the invention is to resolve these sensing problematics simply and efficiently.

Yet another object of the invention is to propose a solution making it possible to prevent any ill-timed sensing, and to do so even though the actuator must be capable of being subjected, in particular, to harsh, outside chemical, climatic or electrical environments.

In particular, the invention proposes to use the contact that is formed between the sphere which terminates the rod and the female sphere of the secondary path, when the secondary path is under load, in order to sense that the load has been relieved by the secondary path, by the wear occurring on an interposed sensing element.

The proposed device is characterized in particular in that at least one sensing element is disposed on the male shape terminating the rod, on the female shape or between both of these two shapes, this sensing element being designed to wear down due to friction between the male shape and the female shape, when the secondary path is loaded and is relieving the load, this sensing element being connected or capable of being connected to processing means capable of sensing wear on this sensing element.

Owing to this sensing element, it is therefore possible to trigger an alarm when the secondary path is under load and wearing occurs.

In one embodiment, in particular, the male shape, which terminates the rod, and the female shape of the fastener are spherical, a sensing element being a fairlead extending along a circular generating line of either of these two shapes.

A structure such as this has the advantage of having high reliability, since it enables an almost fail-proof wearing of the sensing element, independently of the way in which the two male and female shapes come into contact with one another during load relief by the secondary path.

Alternatively, it is possible to anticipate point-based wear-sensing elements, which are suitably disposed on the male shape and/or on the female shape in order to cover the entire contact area between these two shapes and various respective positions thereof.

The fairlead cable solution, however, avoids heavily multiplying the number of sensing elements.

Furthermore, a device such as this is advantageously completed by the following various features taken alone or in combination:

- the male shape which terminates the rod and/or the female shape of the fastener has(have) a groove along at least one generating line, which is intended for receiving a fairlead;
- the male shape which terminates the rod and/or the female shape of the fastener has(have) at least one circular groove perpendicular to the axis of the screw and hollow shaft;
- the male shape which terminates the rod and the female shape of the fastener have two parallel grooves disposed on two of these hemispheres;
- the sensing element is a cable comprising an electrically conductive wire disposed inside an electrically insulating material;
- the processing means comprise means for sensing an incident by sensing that the circuit of a sensing element or grounding thereof has been disconnected.

The invention also relates to a flight control actuator, and in particular a THSA-type actuator, characterized in that it comprises a device such as this.

PRESENTATION OF THE FIGURES

Other features and advantages of the invention will become more apparent from the following description, which is merely illustrative and non-limiting, and which should be read with regard to the appended drawings, in which:

FIG. 1 is a schematic representation showing the principle of an actuator comprising a load-relief sensing device according to one possible embodiment of the invention;

FIG. 2 is a cross-sectional representation of a detail of the end of the actuator on which is mounted a sensing device like the one shown in FIG. 1;

FIG. 3 is another cross-sectional schematic representation of a detail of this end;

FIG. 4 is a perspective representation of the secondary top fastener of an actuator comprising a sensing device like those of FIGS. 1 to 3;

FIG. 5 shows an exemplary structure for a fairlead of a sensing device according to one possible embodiment of the invention;

FIG. 6 shows the wear on a cable-type sensing element during loading of the secondary path;

FIGS. 7 and 8 show two other possible embodiments of the invention.

DESCRIPTION OF AN EMBODIMENT

General Structure of the Actuator

FIGS. 1 to 4 are schematic representations of a flight control actuator 1 with a primary path and a secondary path.

This actuator 1, for example, is a THSA-type actuating cylinder for controlling a trimmable horizontal stabilizer of an aircraft.

It comprises a primary path which includes a screw 3 connected at one end to the airplane structure S1. The primary path also includes a nut 5, which cooperates with the screw 3 by being mounted thereon, and which is connected to the stabilizer 2 being controlled, e.g., by means of another, dial-operated system 6.

An emergency rod 9 extends into the socketed screw 3. This rod 9 terminates in a spherical head 7 positioned with an allowance inside of a female spherical shape 10 of fastener head 8 of the secondary path, this fastener head 8 itself being attached to a structure S2 of the airplane.

This actuator, for example, is controlled by a hydraulic or electric motor M, which drives the screw 3 in rotation and moves the nut 5 in translation, the latter being locked in rotation. The translational movement of the nut 5 thereby makes it possible to control the desired tilt to be given to the trimmable horizontal stabilizer 2.

Load Sensing

Means enabling information to be provided about the sensing of secondary path loading will now be described.

These means, for example, comprise one or more fairleads 11 each distributed along a circular generating line of the female spherical shape 10 (FIG. 1).

One or more grooves 13 can be provided for this purpose on the inside surface of the female spherical shape 10 of the fastener head 8, a groove 13 such as this having a depth much smaller than the semi-diameter of the cable 11 that it receives, the latter extending as an allowance over the inside surface of the female spherical shape 10.

Alternatively, the fairlead or fairleads 11 could be held by the male sphere 7.

Likewise, in alternatives not shown, parts 7 and 8 could have shapes other than spherical shapes; in particular, they could have rotational shapes, e.g., oval shapes.

When the primary path breaks down, the spherical head 7 (in rotation) and the female spherical head 10 come into contact, thereby very quickly producing wear on the cable or cables 11.

In the example shown in the figures, two cables 11 of this type are provided, which are disposed along two generating lines parallel and perpendicular to the back-up shaft 9 and the screw 3, these two generating lines being disposed on two different hemispheres of the head 7 or inside spherical shape 10, so as to make it possible to sense if the secondary path has been traction or compression stressed.

Depending on the geometry of the male and female rotational shapes, a larger number of fairleads may be anticipated for covering all of the contact positions: some geometries, for example, may require an intermediate cable, in order to factor in pitching between the two shapes.

A fairlead 11 such as this, for example, is a cable comprising one or more lead wire elements, which are connected to electrical circuitry 12 making it possible to sense the disconnection thereof and to provide this information to the computer, for example (sensing the disconnection of a circuit or grounding). The pilot is then informed of a THSA-related incident.

In FIG. 4, the cables 12a show the electrical connection between the circuitry 12 and the fairleads 11.

The circuitry 12, for example, can be an already existing flight control circuit already equipping aircraft thus far, the fairlead 11 and the connecting cables being connected in series to this circuit 12.

The structure of a cable 11 such as this, for example, is of the type shown in FIG. 5, and comprises an electrically conductive wire 13 disposed inside an electrically insulating material 14, the assembly being disposed inside a mechanically protective and electromagnetic radiation protective case 15.

The wire 13 and the jacket 15, for example, are made of nickel, the insulating material possibly being made of magnesium.

A structure such as this has a very good resistance to temperature as well as a very good resistance to electromagnetic waves.

It therefore has the advantage of having a very high degree of sturdiness in the various environments likely to be encountered in aeronautics.

The cable or cables are held in place inside the grooves 13 by gluing or soldering.

As shown in FIG. 6, during load relief by the secondary path, the cable 11, wedged in contact between the male and female shapes 7 and 10, gradually wears down, whereby the lead wire 13 thereof (or one of the lead wires thereof) wears down and breaks.

Other alternative wear-sensing elements may be anticipated, e.g., point-based wear-sensing elements, suitably distributed and disposed on the male shape and/or female shape in order to cover the entire contact area between these two shapes and the various respective positions thereof.

FIG. 7 shows, in particular, a solution with several point-based wear-sensing elements 16 each consisting of a chip encasing an electrical wire and mounted on the female shape so as to protrude inwardly. These various elements are distributed so as to cover substantially all of the relative contact positions between the male shape and the female shape.

As another alternative, as shown in FIG. 8, and in the case of a solution with a cable, the latter can be a strip 17 comprising a coated wire protruding along an inside circular generating line of the female shape.

The invention claimed is:

1. Device for sensing load relief by a secondary path of a flight control actuator having a primary path and a secondary path capable of relieving the load of the primary path in the event of a breakdown thereof, the primary path comprising a screw, the screw terminating in a fastener of the primary path, the secondary path comprising an emergency load relief rod passing through the screw, this rod terminating in a male shape which, when the primary path is carrying the load, is accommodated inside of a female shape of a fastener of the secondary path, the male shape, which terminates the rod, and the female shape of the fastener being spherical or rotational, characterized in that at least one sensing element is disposed on the male shape terminating the rod, on the female shape or between both of these two shapes, this sensing element being designed to wear down due to the friction between the male shape and the female shape, when the secondary path is loaded and is relieving the load, this sensing element being connected or capable of being connected to processing means capable of sensing wear on this sensing element.

2. Device of claim 1, characterized in that a sensing element is a fairlead extending along a circular generating of either of these two shapes.

3. Device of claim 2, characterized in that the male shape, which terminates the rod, and/or the female shape of the fastener has (have) a groove along at least one generating line, which is intended for receiving a fairlead.

4. Device of claim 2, characterized in that the male shape, which terminates the rod, and/or the female shape of the fastener have at least one circular groove perpendicular to the axis of the screw and hollow shaft.

5. Device of claim 4, characterized in that the male shape, which terminates the rod, or the female shape of the fastener have at least two parallel grooves disposed on both of the two hemispheres, respectively.

6. Device of claim 1, characterized in that the sensing element is a cable comprising one or more electrically conductive wires disposed inside an electrically insulating material and in mechanical case ensuring electromagnetic protection.

7. Device of claim 1, characterized in that the processing means comprise means for sensing an incident by sensing that the circuit of a sensing element or grounding thereof has been disconnected.

8. Device of claim 2, characterized in that the cable is a strip comprising a coated wire protruding along an inside circular generating line of the female shape.

9. Device of claim 1, characterized in that wear-sensing element is a point-based element.

10. Device of claim 3, characterized in that the male shape, which terminates the rod, and/or the female shape of the fastener have at least one circular groove perpendicular to the axis of the screw and hollow shaft.

11. Device of claim 10, characterized in that the male shape, which terminates the rod, or the female shape of the fastener have at least two parallel grooves disposed on both of the two hemispheres, respectively.

* * * * *